(No Model.) 2 Sheets—Sheet 1.
C. YOUNG.
COTTON SEED HULLER AND SEPARATOR.
No. 577,394. Patented Feb. 16, 1897.
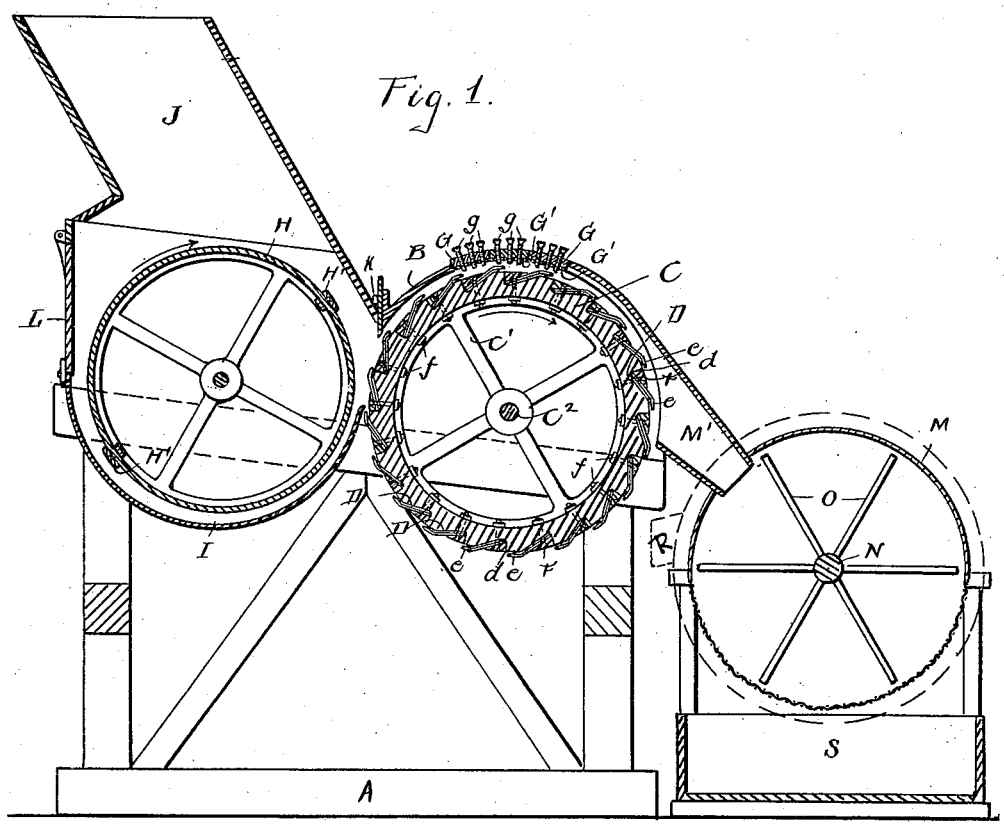
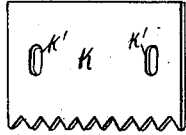
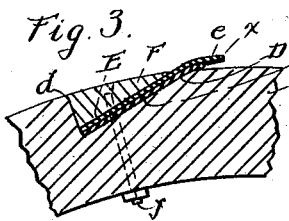
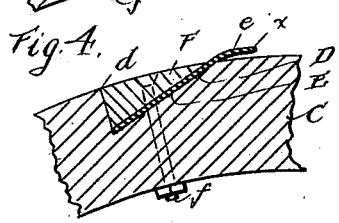
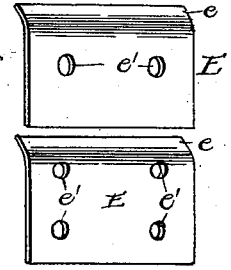
Witnesses.
G. M. Anderson
Phil C. Masi
Inventor.
C. Young,
E. W. Anderson
his Attorney.

(No Model.) 2 Sheets—Sheet 2.
C. YOUNG.
COTTON SEED HULLER AND SEPARATOR.
No. 577,394. Patented Feb. 16, 1897.
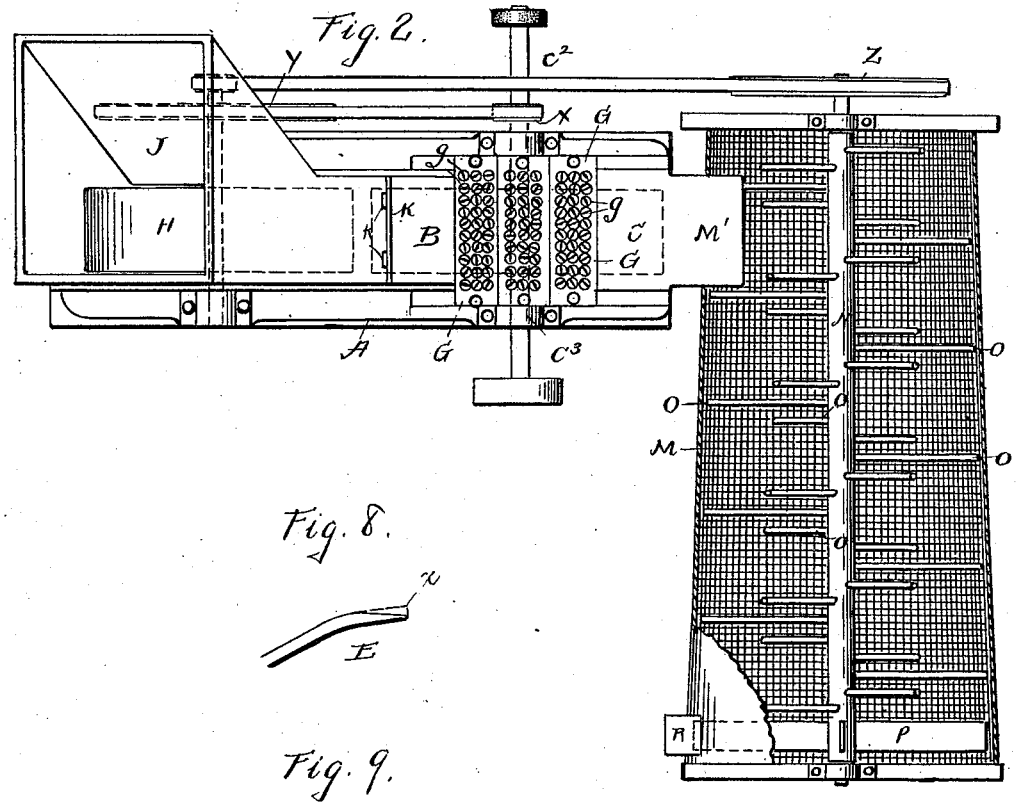
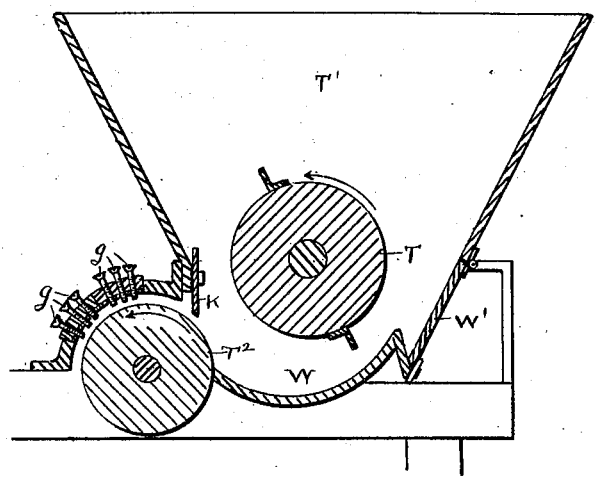
Witnesses.
G. M. Anderson
Phil C. Masi
Inventor.
C. Young
by E. W. Anderson
his Attorney.
THE NORRIS PETERS CO., PHOTO-LITHO., WASHINGTON, D. C.

UNITED STATES PATENT OFFICE.

CORNELIUS YOUNG, OF SELMA, ALABAMA, ASSIGNOR TO THE COTTON STATES MACHINERY COMPANY, OF SAME PLACE.

COTTON-SEED HULLER AND SEPARATOR.

SPECIFICATION forming part of Letters Patent No. 577,394, dated February 16, 1897.

Application filed May 7, 1896. Serial No. 590,564. (No model.)

*To all whom it may concern:*

Be it known that I, CORNELIUS YOUNG, a citizen of the United States, and a resident of Selma, in the county of Dallas and State of Alabama, have invented certain new and useful Improvements in Cotton-Seed Hullers and Separators; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a section on the line $x\,x$, Fig. 2. Fig. 2 is a plan view of machine, the separator being in section. Figs. 3 and 4 are enlarged sectional views to illustrate the application of knives to cylinder. Fig. 5 is a perspective view of fender-plate. Figs. 6 and 7 are perspective views of one of the knives. Fig. 8 illustrates the wear of the knives. Fig. 9 is a sectional view showing modification of invention.

This invention has relation to certain new and useful improvements in cotton-seed hulling and separating mills, and is designed to provide a mill which is adapted for plantation use and with seed from which the foreign matter has not been removed by previous operations. Seed of this kind usually contains a considerable amount of sand and gravel, and also frequently other hard substances—such as pieces of rock, nails, or scrap-iron—and great difficulty has been experienced in constructing a mill which would satisfactorily perform this class of work, the difficulty arising partly from the fact that the presence of sand and grit causes an extremely rapid wearing away and destruction of the grinding or reducing surfaces, and also from the fact that the passing of a piece of rock, nail, or scrap-iron into the mill is likely to cause great damage thereto.

An object of the present invention is to provide a grinding or reducing cylinder whose knives or reducing-blades are of such character that their effectiveness is not destroyed by wear, but which, on the contrary, up to a certain limit, become sharper by wear, being in effect self-sharpening, whereby the durability of the mill is very greatly increased.

A further object is to provide a concave of improved character and of such construction that its grinding surfaces or points can be quickly adjusted to the wear to provide fresh surfaces or points.

A further object is to provide means for preventing, in so far as possible, the passage of hard foreign substances to the cylinder and concave, and, furthermore, to so construct these parts that should such foreign substances pass the guards the damage caused thereby will be reduced to a minimum.

A further object is to provide a mill of this kind with an improved separator for the meal and hulls.

With these objects in view the invention consists in the novel construction and combination of parts, all substantially as hereinafter described, and pointed out in the appended claims.

Referring to the accompanying drawings, the letter A designates the frame of the mill in which I have shown the invention embodied, and B the casing which closes in the upper portion of the mill.

C designates my improved cylinder, which in the construction shown has an iron body portion carried by spiders C' from a central shaft $C^2$, which is journaled in the boxes or bearings $C^3$. Cut in the peripheral surface of the cylinder at short intervals apart and extending lengthwise thereof entirely around it are a series of knife-seats D, which are deepest at the rear, where they terminate in a square radial shoulder $d$. At their front edges these seats come to the surface of the drum, as indicated.

E designates my improved knives, which consist each of a thin blade of steel of uniform thickness at both its edges. The working edge of the blade is bent or curved over, as indicated at $e$, so that this portion thereof conforms approximately to the curvature of the cylinder. This portion of the blade projects beyond the forward edge of the seat in which it is placed and is separated from the cylinder by a slight space or interval, as clearly indicated in Fig. 3. The blades are secured in place by means of the segment blocks or plates F, which, with the blades, are held by bolts $f$, or it may be by screws.

I prefer to place underneath each blade a spacing or seat plate F', as shown in Fig. 3, whose forward edge portion is projected beyond the surface of the cylinder and is bent or curved downwardly in contact therewith. This plate F' holds the working edge of the blade in proper relation to the surface of the cylinder and prevents its being jammed down too closely upon it in action. In addition to this function of holding the working edges of the blades in proper relation to the surface of the cylinder said plates form fillings for the wedge-shaped spaces which would otherwise occur where the blades enter the cylinder, and thereby prevent such spaces from becoming choked with particles of the seed, which would wedge therein. I may, however, dispense with this plate, as shown in Fig. 4.

Usually the blades are first secured in place upon the cylinder and their working edges are then bent over by suitable tools. They are provided with two series of bolt or screw holes $e'$, as shown in Fig. 7, at equal distances from their opposite edges, or it may be with these holes centrally located, as shown in Fig. 6, whereby when the working portion at one edge has reached its limit of usefulness the blade can be removed and reversed edge for edge. When this is done, the old working edge is hammered out flat, and the new edge is bent over into proper working relation.

It will be observed that the wear of the blade commencing at the point $x$, Fig. 8, instead of destroying its usefulness simply reduces the thickness of its working portion, so that after it has been in use for some time it will have the form shown in Fig. 8, full lines, and will be as effective, if not more so, as at first. In fact, with a proper adjustment of the concave, and it may be with the occasional setting up of the working edge away from the cylinder, it may be used until the curved portion is nearly worn away. It is then reversed in the manner which has been described.

It will be observed from the above that during the whole extent of the wear indicated in Fig. 8 while the forward edge portion of the blade becomes thinner it is in no way shortened. In this respect it is particularly distinguished from the ordinary bevel-edge blades or knives, which immediately begin to shorten under wear and after a little use become nearly or quite square across their edges or worn down to the surface of the cylinder. The present form of blade, even after it has become worn to the extent indicated in Fig. 8, is still efficient for considerable use, owing to the fact that its wearing-surface is approximately parallel or concentric with the surface of the cylinder, and also with the working surface of the concave, so that the wear thereon is gradual. It should also be stated that the distance between the surface of the cylinder and the under surface of the bent portion of the blade must in all cases be less than the thickness of a cotton-seed.

In order to provide access to the cylinder for adjusting the knives, the frame below it is entirely open, as shown in Fig. 1.

The second part of my invention relates to a concave which will now be described. In the drawings I have shown this concave as situated in the breast of the casing above the upper portion of the cylinder in order to adapt the operation to the arrangement of feed which is shown, but it will be readily understood that its position may be varied with respect to the cylinder in accordance with the general character of the mill in which it is used. This concave consists of a number of parallel contiguous blocks or segment-plates G in lengthwise relation to the cylinder and securely, but removably, bolted to the frame. I have usually formed these blocks of wood with a steel lining G', but this is not essential, except from an economical standpoint, as they may be entirely of metal. Each of these plates is thickly studded with screws $g$, which project therethrough toward the cylinder and whose points form the working surface of the concave. I usually employ for the purpose common wood-screws which have been subjected to the well-known hardening processes. The points of these screws after they are set in the block G are first ground off square, and they are then properly adjusted with respect to the blades or knives of the cylinder. As their points wear away they are turned slightly to compensate for such wear and to present fresh working surfaces. Usually I place an emery-wheel on the shaft of the cylinder, and after the screws have become considerably worn and uneven the blocks are removed and the screws are sharpened and ground down by the action of this wheel.

An important advantage of the arrangement and construction of concave, as shown and described herein, is the perfect accessibility of the screws for purposes of adjustment.

H designates a feed-drum which in the mill shown is of about the same diameter as the cylinder, behind which it is journaled in a slightly-higher plane. Extending lengthwise of the surface of this drum is one or more thin ribs H'. In the drawings I have shown two of these ribs located diametrically opposite from each other, but any suitable number may be employed. The drum turns in a casing I, whose upper forward portion extends up between the drum and cylinder.

The casing is eccentric with relation to the drum, so that while at its upper forward edge it is separated therefrom by a comparatively narrow space it gradually recedes therefrom below and to the rear thereof.

J designates the hopper, which is supported over said drum and is arranged to discharge tangentially to its upper forward portion.

K is a guard or fender plate which, in connection with the arrangement just described, forms the third part of my invention, although said plate may also be used in connection with a different arrangement of feed. Said plate is arranged vertically above rear portion of the cylinder, with its lower edge a short distance from the surface thereof. It is secured in the frame or casing by bolts or screws $k$, to receive which the plate is slotted at $k'$, whereby its vertical adjustment is provided for. The lower edge of the plate is preferably toothed in order to more readily pass the seed, but it may have a plain edge.

The operation of the mill as thus far described is as follows: The cylinder and feed-drum are rotated in the same forward direction as indicated by the arrows, the speed of the former being preferably about three times that of the latter, which is usually about five hundred rotations per minute, while that of the former is fifteen hundred. The said discharge from the hopper falls between the drum and the cylinder, being caught by the latter and carried to the concave, where it is reduced. Some of the seed falls down through below the drum, which carries it around again to the action of the cylinder. In fact in operation there is all the time a considerable amount of seed in the eccentric casing I, which is being carried around by the drum. The greater part of the gravel and other large foreign substances will naturally fall into the lower portion of this casing and be carried to the lower rear portion thereof, where it may be removed from time to time through a suitable door L. Some of these foreign materials will, however, be caught by the cylinder, but these, if of much size, are knocked back by the fender or guard K. However, should a nail or the like succeed in passing this guard, it is forced up between the screws, where it lies harmless, and beyond, perhaps, a small gap or break in one of the knives no damage it caused thereby.

The fourth part of the invention consists in a hull and meal separator. This comprises a cylinder-casing M, into one end of which the product from the cylinder is automatically discharged through a spout M'. The lower half of this casing is of wire-cloth, as shown. Journaled centrally of said casing is a longitudinal shaft N, which carries throughout its length a series of spirally-arranged beaters O, which gradually increase in length from the receiving to the discharge end of the casing, which is of tapered form. Beyond the last beater the shaft carries the paddles P, which, in operation, serve to carry the hulls up to the discharge at R at the rear side of the casing and above its center. The meal in passing through the casing is forced through the screen into the compartment S underneath.

In Fig. 9 I have shown a modified arrangement of the cylinder, feed-drum, and hopper. In this arrangement the feed-drum (designated by T) is located within the lower portion of the hopper T', considerably above the plane of the cylinder $T^2$, and at a greater distance therefrom than in the mill first described. The action is, however, substantially the same, as will be apparent. W in this figure indicates a pocket in which the foreign substances are collected by the action of the drum T. W' is a door through which these substances are removed.

The drawing Fig. 2 indicates a suitable arrangement of the driving-pulleys X, Y, and Z, for the drum, cylinder, and separator-shafts.

Having thus described my invention, what I claim as new, and desire to secure by Letters Patent, is—

1. In a grinding or reducing mill, a cylinder whose working surface is formed by a series of lengthwise-extending blades secured therein, the working edges of the said blades being bent over to conform approximately to the curvature of the cylinder, and separated from the surface thereof by a distance less than the thickness of the seed to be operated upon, substantially as specified.

2. In a grinding or reducing mill, a cylinder whose working surface is formed by a series of lengthwise-extending blades, reversibly seated and projected beyond the surface of the cylinder and bent or curved forwardly to conform approximately to the surface thereof, the under surfaces of the bent portions of said blades being separated from the cylinder by a space which is of less height than the thickness of the seed to be operated upon, substantially as specified.

3. In a grinding or reducing mill, the combination with the cylinder having the inclined, lengthwise-disposed peripheral seats thereon, of the spacing, or seat plates, in the bottom of said seats having their forward edge portions projecting beyond the surface of the cylinder, the knife-blades placed upon the said plate with their forward edges or working portions projected beyond the same and also beyond the surface of the cylinder, said portions being bent over to conform approximately to the surface of the cylinder, the segmental securing-blocks, and the fastening screws or bolts which pass through said blocks and the blades and seat-plates, substantially as specified.

4. In a grinding or reducing mill, a cylinder whose working surface is formed by a series of lengthwise-extending thin blades secured thereto at short intervals apart, said plates having thin working edge portions bent or curved downward out of the plane of the blade, such bent portions conforming approximately to the curvature of the cylinder, but separated therefrom by a space of less height than the thickness of the seed to be operated upon.

5. In a grinding or reducing mill, a concave whose working face or surface is formed by the points or ends of a plurality of adjusting-screws, the heads of the said screws extending beyond the outer surface of the part in which they are seated whereby they are readily accessible for adjustment, substantially as specified.

6. In a grinding or reducing mill, a concave consisting of removable blocks or segments thickly studded with screws whose inner ends project beyond the inner surfaces thereof, and form the working surface of the concave and whose grooved heads extend beyond the outer surface of said blocks, whereby they are readily accessible for adjustment, substantially as specified.

7. In a grinding or reducing mill, the combination with a cylinder whose working surface is formed by a series of blades secured therein and whose working edges are bent over to conform approximately to the surface of the cylinder, but are separated therefrom by intervals of less height than the thickness of the seed to be operated upon, of a concave whose working surface is formed by the points or ends of a plurality of screws, substantially as specified.

8. In a grinding or reducing mill, the combination of the cylinder, the concave above the upper portion of the cylinder, the feed-drum in front of the cylinder and designed to be rotated in the same direction, the eccentric casing which surrounds the lower portion of said drum, the hopper, and the fender-blade whose lower edge is adjacent to the front portion of said cylinder, substantially as specified.

In testimony whereof I affix my signature in presence of two witnesses.

CORNELIUS YOUNG.

Witnesses:
PHILIP C. MASI,
GEORGE H. PARMELEE.